United States Patent [19]

Dubois et al.

[11] 4,434,190

[45] Feb. 28, 1984

[54] PROCESS FOR PREVENTING FORMATION OF BLACK ICE ON ROADS BY APPLYING A MIXTURE OF SALT AND AQUEOUS FIXATION COMPOSITION ONTO THE ROAD SURFACE

[75] Inventors: Robert Dubois; Pierre-Yves Dubois, both of Lutry, Switzerland

[73] Assignee: Selfixat, S.A., Geneva, Switzerland

[21] Appl. No.: 404,861

[22] Filed: Aug. 3, 1982

Related U.S. Application Data

[63] Continuation of Ser. No. 194,952, Oct. 8, 1980, abandoned.

[30] Foreign Application Priority Data

Oct. 11, 1979 [FR] France .................................. 79 25299

[51] Int. Cl.³ ........................... B05C 1/16; B05D 5/10
[52] U.S. Cl. ...................................... 427/136; 106/13; 252/70
[58] Field of Search ............... 427/136, 407.1; 252/70; 106/13; 404/75

[56] References Cited

U.S. PATENT DOCUMENTS

| 4,012,537 | 3/1977 | Dubois | 427/136 |
| 4,094,686 | 6/1978 | Dubois | 427/136 |

FOREIGN PATENT DOCUMENTS

2512691 9/1976 Fed. Rep. of Germany ........ 106/13

*Primary Examiner*—Sadie L. Childs
*Attorney, Agent, or Firm*—Cushman, Darby & Cushman

[57] ABSTRACT

A road surface has fixed thereon a salt which lowers the freezing point of water by means of an aqueous fixation composition which comprises a mixture of an adhesion-promoting agent formed by an aqueous dispersion of a film-forming polymer or copolymer and a water-soluble hydrophobic agent which, in air, becomes insoluble in water. The proportion by weight of hydrophobic agent relatively to the dry extract of the adhesion-promoting agent is from 5 to 25%. The fixation composition is used in a proportion such that all the adhesion-promoting agent and the hydrophobic agent represents, in dry weight, from 10 to 120% of the weight of the salt. The aqueous fixation composition may in addition possibly comprise a foam-inhibiting agent and/or a second hydrophobic agent.

5 Claims, 1 Drawing Figure

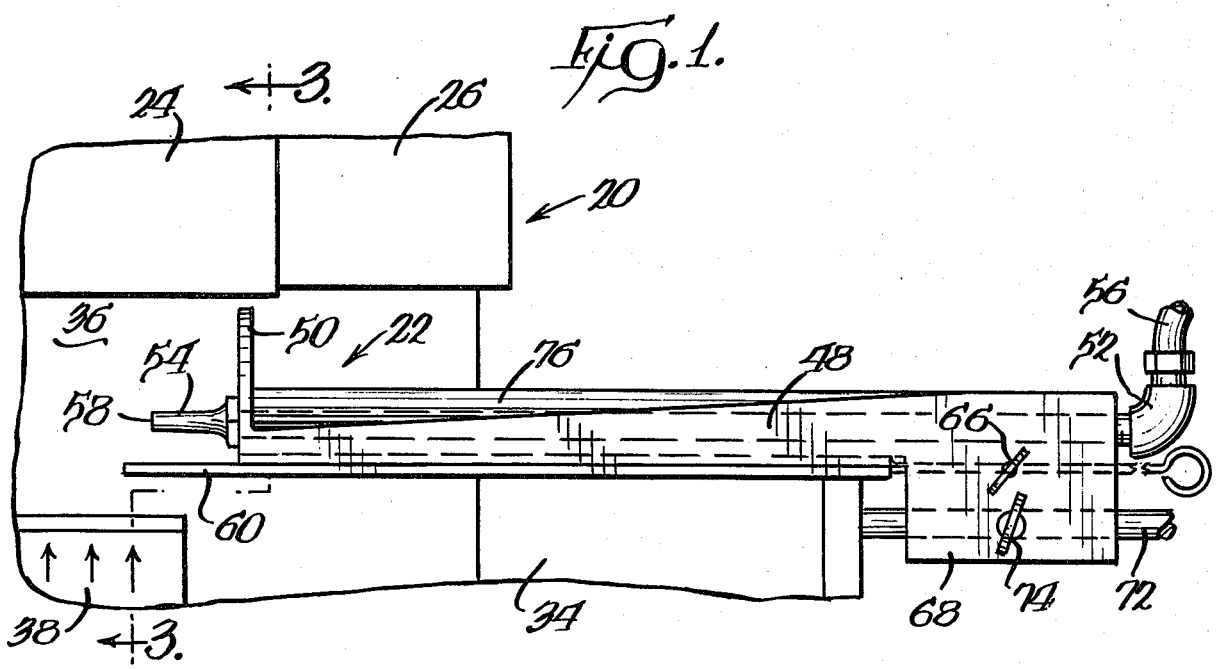
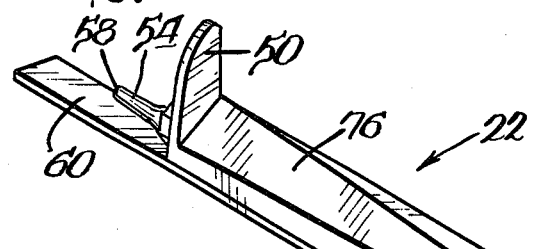
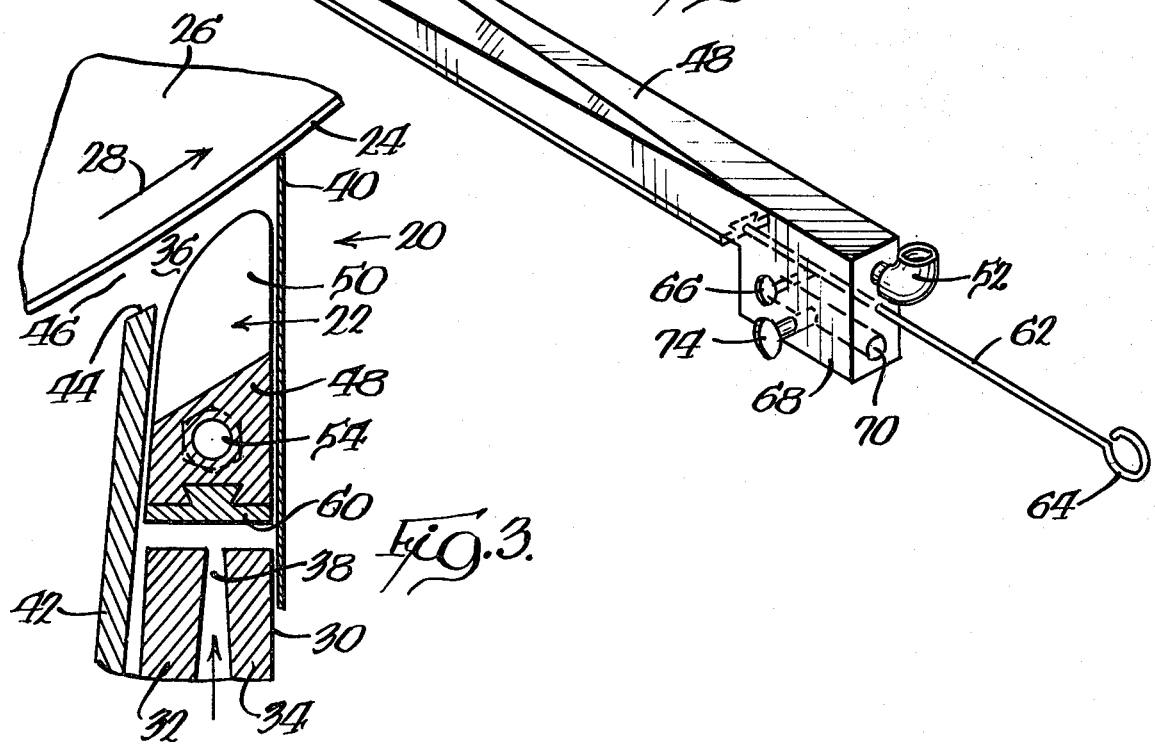

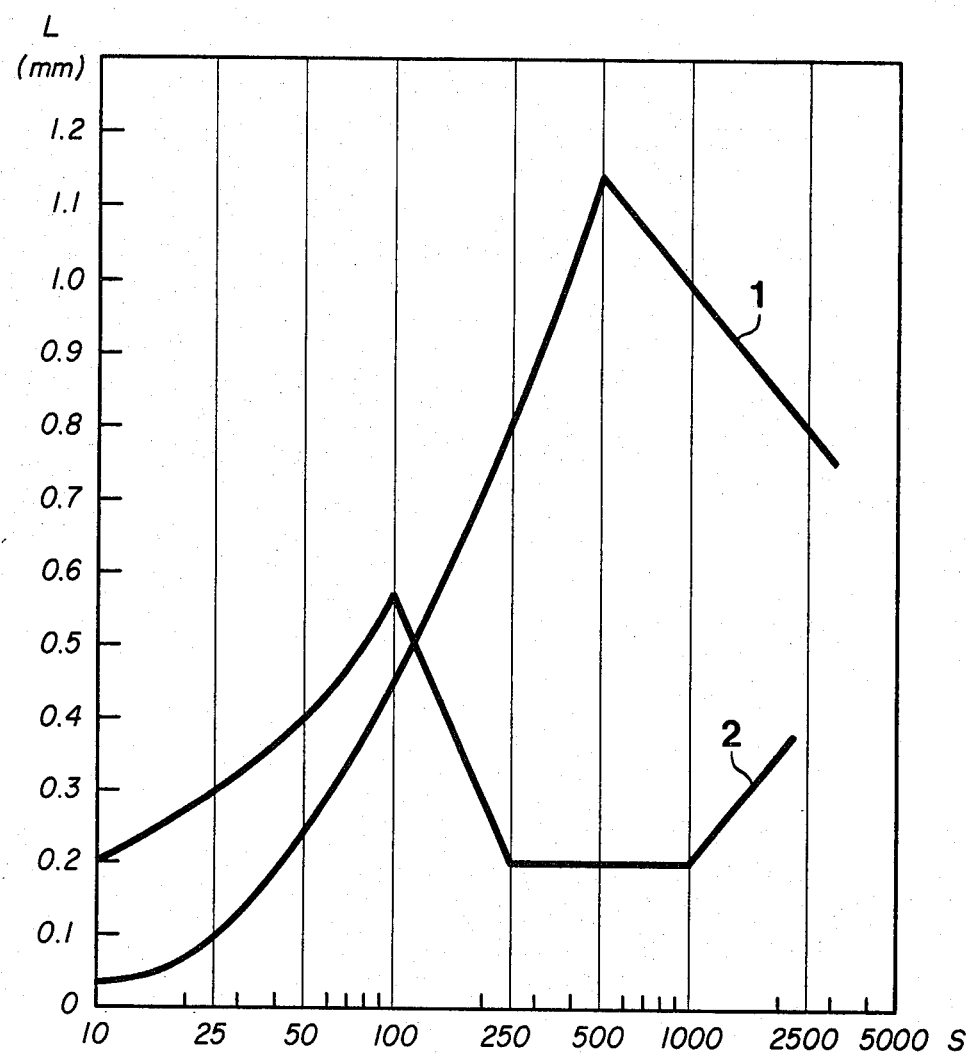

PROCESS FOR PREVENTING FORMATION OF BLACK ICE ON ROADS BY APPLYING A MIXTURE OF SALT AND AQUEOUS FIXATION COMPOSITION ONTO THE ROAD SURFACE

This is a continuation, of application Ser. No. 194,952 filed Oct. 8, 1980, now abandoned.

The present invention is concerned with a process for preventing the formation of black ice on roads and for assisting the melting of the snow. The invention is also concerned with a fixation composition for carrying this process into effect.

Different types of processes for preventing the formation of black ice on roads are known. The earliest of these processes consist in carrying out a salting of the roads with products which lower the freezing point of water, namely, salts such as sodium chloride, calcium chloride, magnesium chloride or ethylene glycol.

The most usual salting operation is carried out with sodium chloride. Such a salting is only effective for a very limited period of time. Actually, if the salting is undertaken in the dry state on a dry roadway, the traffic quickly removes a large part of the salt. If the roadway is wet, the salt has a tendency to stick to the road and the traffic has only little influence on the elimination of the salt; this is the reason why a salting with a brine or a wet or moist salt has sometimes been used. However, another phenomenon may intervene for completely eliminating the salt, i.e. rain; the pre-salting becomes completely ineffective, because the rain water quickly dissolves the salt, which thus runs off the roadway. The accidents which are caused by black ice on salted roads are the result of the occurrence of one or other of these two phenomena. In addition, the number of occurrences during the winter becomes very important, because it is necessary continuously to renew the salting. The damage caused to the environment, the sometimes considerable increase in the salinity of lakes and rivers, and even also of ground waters, are the result of the intensive salting operations such as are carried out these days for combatting the formation of black ice.

It has also been proposed to incorporate salts inside the road surface. However, this type of procedure is very expensive.

The present invention has for its object to overcome the aforementioned disadvantages by providing a process for preventing the formation of black ice on roads, which process is efficient for a long time period and at a lower overall cost than the conventional systems and sparing the environment because of the very small quantity of distributed salt, thus decreasing the dangers of corrosion.

The present invention has for its object to fix a salt conventionally used for preventing the formation of black ice on road surfaces.

To this end, the present invention has for its object a process which is characterised in that a salt lowering the freezing point of water is fixed on a road surface with the assistance of an aqueous fixation composition which comprises a mixture of an adhesion-promoting agent formed by an aqueous dispersion of a film-forming polymer or copolymer and a water-soluble hydrophobic agent which, in air, becomes insoluble in water, the proportion by weight of hydrophobic agent relatively to the dry extract of the adhesion-promoting agent being from 5 to 25%, this fixation composition being used in a proportion such that the total of the adhesion-promoting agent and of the hydrophobic agent represents, in dry weight, from 10 to 120% of the weight of the salt. Preferably, the proportion by weight of hydrophobic agent relatively to the dry extract of the adhesion-promoting agent is from 10 to 15%. It is also preferable for the fixation composition to be used in a proportion such that the total of the adhesion-promoting agent and of the hydrophobic agent represents, in dry weight, from 25 to 60% of the weight of the salt.

The aqueous fixation composition may in addition comprise a foam-inhibiting agent at the rate of 10 to 20,000 ppm in dry weight.

In accordance with a first method of carrying out the process according to the invention, the road surface has applied thereto a single layer or coating of an aqueous composition comprising a mixture of salt and of the fixation composition. This composition penetrates deeply into the pores and cavities of the road surface. The water is allowed to evaporate. After evaporation of the water, salt crystals are obtained which are coated by a skin which is practically impermeable to running water, but permeable to water vapour. The salt crystals are in addition fixed firmly to the road surface.

Thus, the salt crystals are at the same time resistant to being washed out by rain and to road traffic. Because of the permeability of the coating film to water vapour, they nevertheless remain effective for combatting the formation of black ice.

According to a preferred procedure, the composition is applied in several layers or coatings, the overall proportion of the combination of the adhesion-promoting agent and of the hydrophobic agent remaining within the previously indicated limits of 10 to 120% of the weight of salt, for the different layers or coatings considered together, but this proportion of the fixation composition relatively to the weight of the salt may vary within wide limits for each individual layer or coating.

Thus, in the event of a three-layer deposition, the following application is carried out: a first layer of a composition with a high content of fixation composition and a low content of salt; a second layer of a composition with a high content of salt and a low content of fixation composition; and a third layer of a composition with a high content of fixation composition and low content of salt, while allowing the water to evaporate between each application.

By a composition with a high content of fixation composition and a low content of salt is understood a composition which contains from 0.5 to 500 parts of dry extract, by weight, of fixation composition to 1 part by weight of salt, and by a composition with a high content of salt and a low content of fixation composition is understood a composition which contains from 0.5 to 50 parts of dry extract, by weight of fixation composition to 100 parts by weight of salt, these parts being expressed in dry weight.

The salt which is used is advantageously sodium chloride, both for reasons of cost and efficiency. Other salts may, however, be used and particularly chlorides such as magnesium chloride, and also nitrates.

The sodium chloride is advantageously applied at the rate of 10 to 100 g/m$^2$ of road surface. It is generally used in a conventional manner in the form of a saturated aqueous solution.

The adhesion-promoting agent is formed by an aqueous dispersion of a film-forming polymer or copolymer. Practically any dispersion of a film-forming polymer or copolymer is suitable, especially those obtained by polymerisation or copolymerisation of monomers having one or more ethylenic bonds.

This agent is advantageously an aqueous dispersion of a styrene-butadiene copolymer containing 30 to 80% by weight of styrene. As other examples, it is possible to mention aqueous dispersions of vinyl polymers or copolymers such as polymers or copolymers of vinyl acetate or vinyl chloride.

The foam-inhibiting agent is any appropriate agent which is compatible with the adhesion-promoting agent and the hydrophobic agent and especially a silicone oil, such as the product marketed by Rhone Poulenc under the name "Rhodorsil 416".

The water-soluble hydrophobic agent is more especially a siliconate, for example an alkyl siliconate of sodium, potassium or calcium. This type of product, which is especially a methyl siloxane having a $CH_3/Si$ ratio of 0.5 to 1.8, is conventionally used for the waterproofing of concretes. It is converted under the action of the carbon dioxide of the air into a water-insoluble silicone and a metallic carbonate.

For improving the hydrophobic character of the film which is obtained, it is possible for the fixation composition to have added thereto a second hydrophobic agent which is selected particularly from the long-chain ($C_6$ to $C_{18}$) monoamines or polyamines which are water-soluble or made water-soluble or dispersible, $C_8$–$C_{22}$ N-alkyl polypropylene monoamines or diamines or long-chain ($C_{16}$ to $C_{30}$) monoalcohols, at the rate of 0 to 5% of the fixation composition, as dry weight.

As examples of long-chain water-soluble amines, there may be mentioned the products which are marketed under the names "Duomeen", which are $C_6$–$C_{18}$ alkyl propylene diamines and "Armeen", which are $C_6$–$C_{18}$ alkyl amines.

The fixation composition is prepared by the adhesion-promoting agent and the hydrophobic agent or agents and possibly other ingredients being mixed while stirring.

The process according to the present invention, and especially the modified form in which several layers or coatings are deposited, has four essential advantages with respect to the traditional process:

(1) the salt crystals are stuck to the roadway when all the water of the composition (including brine) is evaporated.

(2) the salt crystals are practically completely protected against the washing out which is caused by running water, on account of the polymeric membrane protecting them being impermeable to water but permeable to water vapour, as long as the relative humidity reaches or exceeds 75%.

(3) the surface tension of the composition being used in the process of the present invention is greatly lowered, this making possible a good penetration of this latter to the bottom of the pores in the road surface, thus establishing a salt reserve out of reach of the rain water.

In actual fact, laboratory tests have demonstrated that the addition of the fixation composition to a saturated NaCl brine causes the surface tension which, in the case of the pure saturated NaCl brine, is 82 dynes/cm, to change to a value of about 27 dynes/cm for a mixture containing 1 part of the fixation composition for a proportion of 1.5 to 10 parts of saturated NaCl brine. This remarkable decrease in the surface tension for a brine to which the fixation composition is added permits a better penetration of the product into the pores of the bituminous coatings which form the top layers of road surfaces.

(4) the process of the present invention in its multilayer variant makes possible the perfect control of the dimensions of the salt crystals at the time of evaporation of water from the composition, because of the possibility of regulating the proportion of fixation composition relatively to the brine, in each of the different successively deposited layers. It is possible to obtain crystals having edges from 0.035 mm to 1 mm. It has been calculated that one gram of salt formed with the aid of crystals of which the edges are 0.035 mm represents approximately 11 million crystals, whereas a gram of salt formed with the aid of crystals having edges of 1 mm (i.e., the average dimension of recrystallisation crystals obtained from a conventional brine) represented 500 crystals.

In view of the fact that the efficiency of the salt in combatting black ice depends essentially on the specific surface and thus on the dimension of the crystals, it is apparent that when crystals of much smaller dimensions are obtained as a consequence of adjusting the ratio between fixation composition and brine in the different successively deposited layers, this is a factor which considerably improves the efficiency of the composition according to the present invention.

The following examples illustrate the present invention.

EXAMPLE 1

A fixation composition is prepared by mixing, while stirring:

47.85 parts by weight of an aqueous dispersion of a styrene-butadiene copolymer (having a weight ratio between styrene/butadiene of 60/40), with 50% of dry extract (marketed under the name "Rhodopas SB 012" by Rhone Poulenc), 7.15 parts by weight of a solution of potassium methyl siliconate with 45% by weight of active materials (marketed under the name "Rhodorsil Siliconate 51 T" by Rhone Poulenc), 100 ppm of foam-inhibiting agent "Rhodorsil 416".

With the aid of this composition, an anti-black ice composition was prepared by mixing 55 parts by weight of the preceding fixation composition, 50 parts by weight of salt to be thawed (NaCl originating from Societe des Salines Suisse Reunies)

138 parts of water that is, in total 243 parts of composition.

Tests were carried out with this composition on plates of bituminous coatings by applying the composition at the rate of 50 g of NaCl per square meter, by comparison with a conventional brine applied at the rate of the same quantity of NaCl. The tests were effected after complete evaporation of the water.

The plates being used were plates of 50×18×5 cm, formed of a conventional coating of type AB 16 with a bitumen of penetration 60/70.

TEST FOR RESISTANCE TO WASHING OUT

The plates were immersed in demineralised water (8 liters) and the quantity of salt dissolved in the water in relation to the initial quantity was measured.

| Time | NaCl dissolved % | |
|---|---|---|
| | Conventional brine | Composition according to the invention |
| ½ hour | 100% | 39% |
| 2 hours | — | 55% |
| 17 hours | — | 59% |
| 24 hours | — | 59% |

After complete immersion in the water, 41% of salt, i.e. about 20 g of NaCl/m², still remain after 24 hours on a coating treated with the composition according to the invention.

After immersion for 17 hours, practically no loss of NaCl was found.

TRAFFIC-SIMULATING WEAR TEST

The NaCl not protected by the fixation composition according to the invention was initially determined by a reaction test with AgNO₃. Even after humidification, there was no reaction.

Wear was then simulated by rolling a tyre on the plate. After 5000 passes, the reaction was positive, principally with the passage of the wheel, thus showing that salt still remained.

COLD-SLIPPING TEST

Plates previously treated with a conventional brine or the composition according to the invention were cooled to −30° C. Then equal quantities of water were added to the plates. Ice was formed and the plates were left to be reheated. At a temperature of −15° C., it was found that the ice is detached at the surface of the plates treated with the composition according to the invention, whereas it adheres to the surface of the plates treated with the conventional brine.

Under these same conditions, the slipping, such as measured with an SRT apparatus, was less unfavourable with the composition according to the invention than with the conventional brine.

In addition, road tests were carried out with this composition.

The composition was applied at the rate of 50 g of NaCl per square meter. At the end of 8 months, after a rainfall of 350 mm of water during 55 showers, there still remained sufficient sodium chloride on the road to be effective against any formation of black ice.

EXAMPLE 2

A fixation composition was prepared by mixing, while stirring:
43.5 parts by weight of the dispersion used in Example 1,
6.5 parts by weight of the potassium methyl siliconate solution used in Example 1,
100 ppm of "Rhodorsil 416" foam-inhibiting agent.

Using this composition, an anti-black ice composition was prepared by mixing:
50 parts by weight of the foregoing fixation composition,
100 parts of NaCl,
306 parts of water.

Tests as in Example 1 were carried out with this composition, by applying the composition at the rate of 100 g of NaCl per square meter. Similar results were obtained.

EXAMPLE 3

The following successive three compositions were applied to a road, per square meter, allowing the water to be evaporated between each application:
Composition 1 (rich in fixation composition)
  containing
  38 g of the fixation composition of Example 1,
  5.74 g of NaCl
Composition 2 (rich in salt)
  containing
  4 g of the fixation composition of Example 1,
  41.10 g of NaCl
  134.06 g of water
Composition 3 (rich in fixation composition)
  containing
  8 g of the fixation composition of Example 1,
  3.16 g of NaCl
  6.44 g of water An excellent effectiveness against the formation of black ice was obtained, and also an excellent resistance to wear of the sodium chloride thus coated.

EXAMPLE 4

A composition was prepared as in Example 1, but adding to the fixation composition, 2% of Duomeen T relatively to the weight of the fixation composition.

Perfect resistance as a function of time was obtained in respect of a plate covered with the composition deposited by the process of the invention at the rate of 50 g of NaCl per square meter in laboratory tests concerning the formation of black ice.

EXPERIMENTAL STUDY OF THE ACTION OF THE FIXATION COMPOSITION

For the purpose of demonstrating the advantageous characteristics of the process of the present invention, especially in its modification having several layers, as regards the limitation of the size of the formed sodium chloride crystals, the following tests are carried out.

Test 1

A layer of a mixture of a fixation composition such as defined in Example 1 and of saturated brine is deposited in a thickness of about 60 microns on a sheet of glass and left to dry for 48 hours at 20° C. Let S be the number of parts by weight of saturated brine added to 100 parts by weight of fixation composition.

Examination under a microscope shows that the sodium chloride crystallises in the form of cubic crystals with a very variable morphology as a function of the relative proportion of fixation composition in the mixture. For small added quantities of brine, that is, S from 50 to 100, there is germination of flat crystals, starting from a small central crystal, so as to form cruciform shapes.

On the other hand, in this case, the crystals seem to be particularly well covered by the polymeric coating film. For higher proportions of brine (S=250 to 500), the central crystal increases in size. Also to be noted, starting from the crystal angles, is the presence of considerable branchings of flat crystals, which furrow the space between the crystals. This phenomenon is at a maximum for 500 parts of brine; beyond this point, the branching effects become less considerable and disappear for high quantities of brine (beyond about S=2500).

The single FIGURE in the accompanying drawing shows the representative curve (curve 1) of the variations in the mean length (L), in millimeters, of the edge of the central crystal as a function of S.

Test 2

On a first layer, deposited in the manner as indicated in Test 1, with a relative proportion of fixation composition such that S=50, is deposited a second layer of identical initial thickness.

The mean length L in this second layer is measured for different values of S and the dependence illustrated by the curve 2 of the FIGURE is established.

It is apparent that the second layer or coating has sodium chloride crystals of which the mean length L of the edges is smaller than 0.6 mm, i.e. decidedly smaller than that of the recrystallisation crystals of a conventional brine without fixation composition and that, in particular, by a judicious choice of S, it is possible to obtain crystals of which the size is of the order of 0.2 mm.

It is to be noted that the water content of the fixation composition is not a determining factor, since the water only constitutes a vehicle which is evaporated after application to the road surface. However, in the case where the road surface has applied thereto an aqueous composition comprising a mixture of salt and the fixation composition, it is advantageous to use a sufficient quantity of water for dissolving all the salt and preferably just sufficient for dissolving all the salt.

We claim:

1. Process for preventing the formation of black ice on roads, comprising applying onto the road surface at least one layer of a mixture of at least one salt which lowers the freezing point of water and a fixation composition which comprises an aqueous dispersion of a film-forming polymer or copolymer and at least one water-soluble hydrophobic agent which, in air, becomes insoluble in water, the proportion by weight of hydrophobic agent with respect to the dry extract of the film-forming polymer or copolymer being from 5 to 25%, and the proportion of the fixation composition with respect to the salt being such that the total dry weight of film-forming polymer or copolymer and hydrophobic agent corresponds to from 10 to 120% of the weight of the salt, the process including the steps of applying onto the road surface a first layer of a mixture with a high content of fixation composition and a low content of salt, allowing the water to evaporate, then applying a second layer of a mixture having a high content of salt and a low content of fixation composition, allowing the water to evaporate and finally applying a third layer of a mixture with a high content of fixation composition and a low content of salt.

2. Process for preventing the formation of black ice on roads, comprising applying onto the road surface at least one layer of a mixture of at least one salt which lowers the freezing point of water and a fixation composition which comprises an aqueous dispersion of a film-forming polymer or copolymer and at least one water-soluble hydrophobic agent which, in air, becomes insoluble in water, the proportion by weight of hydrophobic agent with respect to the dry extract of the film forming polymer or copolymer being from 5 to 25%, and the proportion of the fixation composition with respect to the salt being such that the total dry weight of film-forming polymer or copolymer and hydrophobic agent corresponds to from 10 to 120% of the weight of the salt, and wherein the film forming copolymer is a styrene-butadiene copolymer containing from 30 to 80% of styrene.

3. Process for preventing the formation of black ice on roads, comprising applying onto the road surface at least one layer of a mixture of at least one salt which lowers the freezing point of water and a fixation composition which comprises an aqeuous dispersion of a film-forming polymer or copolymer and at least one water-soluble hydrophobic agent which, in air, becomes insoluble in water, the proportion by weight of hydrophobic agent with respect to the dry extract of the film forming polymer or copolymer being from 5 to 25%, and the proportion of the fixation composition with respect to the salt being such that the total dry weight of film-forming polymer or copolymer and hydrophobic agent corresponds to from 10 to 20% of the weight of the salt, and wherein hydrophobic agent is a siliconate.

4. Process according to claim 3, wherein the siliconate is a potassium methyl siliconate.

5. Process for preventing the formation of black ice on roads, comprising applying onto the road surface at least one layer of mixture of at least one salt which lowers the freezing point of water and a fixation composition which comprises an aqeuous dispersion of a film-forming polymer or copolymer and at least one water-soluble hydrophobic agent which, in air, becomes insoluble in water, the proportion by weight of hydrophobic agent with respect to the dry extract of the film forming polymer or copolymer being from 5 to 25%, and the proportion of the fixation composition with respect to the salt being such that the total dry weight of film-forming polymer or copolymer and hydrophobic agent corresponds to from 10 to 120% of the weight of the salt, and wherein the fixation composition comprises a second hydrophobic agent and wherein the second hydrophobic agent is selected from a long-chain ($C_6$ to $C_{18}$) monoamines or polyamines which are water-soluble or made water-soluble or dispersible, the ($C_8$–$C_{22}$) N-alkyl polypropylene monoamines or diamines or the long-chain ($C_{16}$–$C_{30}$) monoalcohols.

* * * * *